Figure 1:
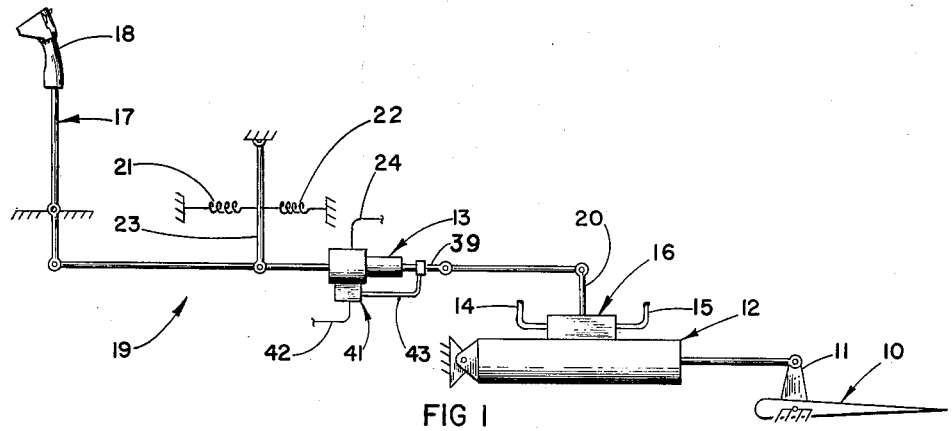

Oct. 23, 1962    W. G. REDMOND ETAL    3,060,362
SERVO SYSTEM
Filed May 15, 1961    2 Sheets-Sheet 1

WILLIAM G. REDMOND
WILLIAM G. STANFIELD
INVENTORS

BY H.C. Goldwire

AGENT

Oct. 23, 1962  W. G. REDMOND ETAL  3,060,362
SERVO SYSTEM
Filed May 15, 1961  2 Sheets-Sheet 2

WILLIAM G. REDMOND
WILLIAM G. STANFIELD
INVENTORS

BY  H.C. Goldwire

AGENT

United States Patent Office 3,060,362
Patented Oct. 23, 1962

3,060,362
SERVO SYSTEM
William G. Redmond and William G. Stanfield, both of Dallas, Tex., assignors, by mesne assignments, to Ling-Temco-Vought, Inc., Dallas, Tex., a corporation of Delaware
Filed May 15, 1961, Ser. No. 110,177
8 Claims. (Cl. 318—489)

This invention relates to servo control systems and particularly to means for effecting smooth transition from control of such a system by signals derived from a plurality of sources to control of the same by a signal or signals derived from a lessened number of sources.

Closed-loop servo systems frequently are employed wherein an actuator, the position of whose output member is indicated by a signal produced by a follow-up device, is controlled by the adjustable output of a first signal source and also, when desired, by the added output of at least a second signal source. Thus, in an aircraft, it is common to find a first source of command signals whose output is received by an amplifier, the amplifier output going to an actuator which itself positions or controls the positioning of a flight control surface. The first source of signals is adjustable, manually or otherwise, to introduce a desired set or trim into the system. A second source of command signals, for example an autopilot, also is connectible into the amplifier, in which its signals are summed with those of the first source of command signals. The amplifier output, representing the sum of the outputs of the two signal sources, drives the servo actuator to a position designated by the combined command signals. The follow-up signal cancels out the command signal input to the amplifier when the actuator reaches the commanded position and thus reduces amplifier output to a nominal zero, thereby resulting in a halting of the actuator until a change in command signal input again causes the amplifier to produce an output large enough to be effective in producing a repositioning of the actuator.

When a second signal source is disconnected from the amplifier, its contribution to the summed command signal controlling the output of the amplifier is instantly removed. Except in the rare case where at the instant of disconnection the second signal source output is zero, this results in an abrupt change in amplifier output and a sudden and possibly violent movement of the control surface or other body positioned by the actuator. Thus, an aircraft which has flown for some time with the autopilot engaged will have experienced a number of events (changes in balance because of fuel expended, variations in airspeed, etc.) which will have caused substantial corrective signals to have entered the autopilot output, which therefore no longer remains the same as when the autopilot was first engaged. Among the trim control devices of the aircraft, the pitch trim control continues to produce a command signal which is summed with the autopilot signals to yield an amplifier output which at a given moment will have so positioned or caused positioning of the elevator actuator as to place or hold the aircraft in a stable pitch attitude. An amplifier output of nominal zero therefore is desired for maintaining this flight condition. Whereas this output is obtained in response to the summation of the outputs of the trim control and the autopilot, switching off the autopilot signal leaves only the trim signal, which almost invariably is of some value other than the sum of itself with the autopilot signal. The result is a sudden and in a sense spurious amplifier output accompanied by inappropriate movement of the elevator actuator and an abrupt departure of the aircraft from its stable attitude in pitch. It will be evident, therefore, that it is highly desirable to provide means for avoiding this and similar difficulties; and to that end it is a major object of the present invention to provide means for effecting smooth transition from control of an actuator by the sum of a plurality of command signals to control of the actuator by a lessened number of the signals.

A related object is to provide means which, upon disconnection of one of a plurality of signal sources, adjusts the output level of the remaining signal source or sources into conformity with the actual position of an actuator before supplying their output for control of the actuator.

Another object is to provide a hand grip incorporating a first command signal source having an element positionally adjustable for varying the signal output thereof and associated with means for driving the element, upon disconnection of a second command signal source and before application of the first command signal source output alone for control of an actuator, to a position corresponding to the actual position of the actuator at the instant of disconnection of the second signal source.

Still other objects and advantages will become evident from the specification and claims and from the accompanying drawing illustrative of the invention.

Figure 2:
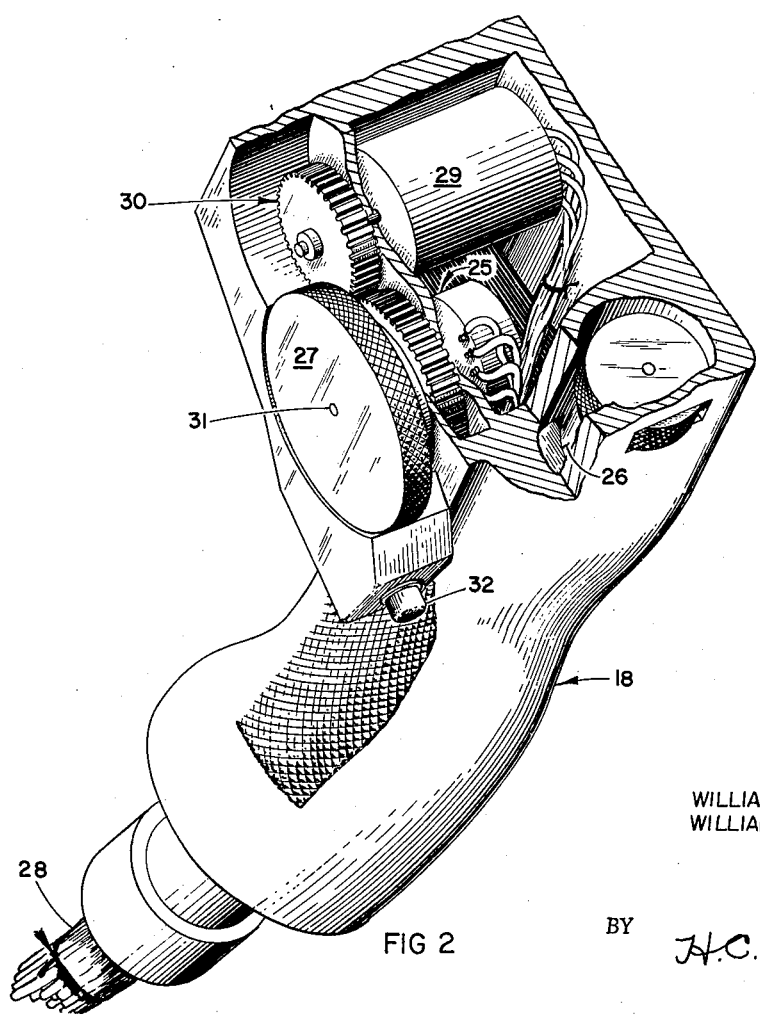
Figure 3:
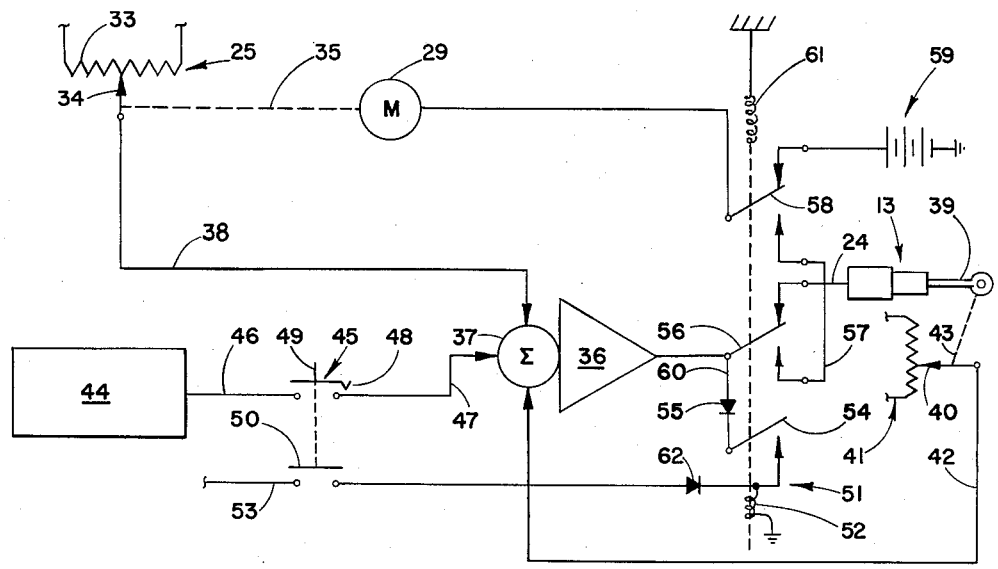
Figure 4:
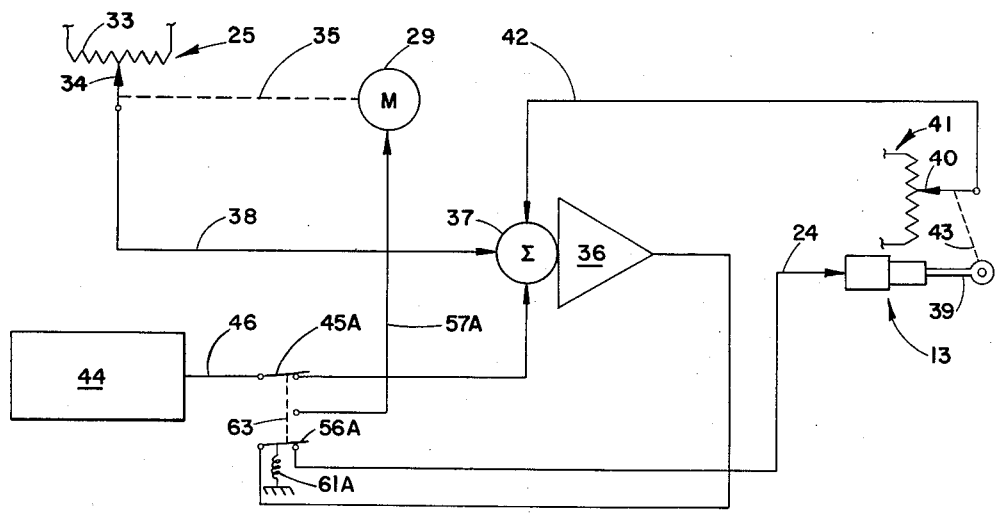
Figure 5:
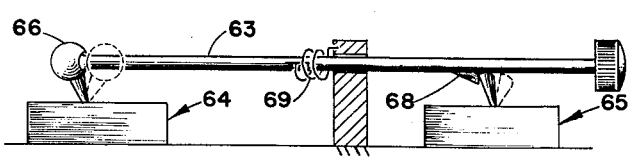

In the drawing,
FIGURE 1 is a schematic representation of a body movable by an actuator which in turn is controllable by a manually operated lever with a grip and by a trim actuator;
FIGURE 2 is a perspective view, partially in section, of the stick grip and showing the servomotor for positioning of the movable element of a first source of command signals located in the stick grip;
FIGURE 3 is a schematic diagram of a form of the invention showing the servo system for control of the trim actuator;
FIGURE 4 is a schematic representation of another mode of carrying out the invention; and
FIGURE 5 is a linkage for implementing manual operation of the switches shown in FIGURE 4.

With reference first to FIGURE 1, the system shown is described, for convenience, as employed for elevator control in an aircraft but is intended to be representative of other control systems in applications both in and out of aircraft. The elevator control surface 10 is deflectable about its pivot center by actuation of its horn or lever 11, this being accomplished by an actuator 12. The actuator 12 is of any convenient type and is shown, for example, as powered by hydraulic fluid supplied through lines 14, 15 to a servo valve 16 mounted on the actuator 12. For control of the valve 16, there is provided a manually controlled lever 17 including a hand grip 18 and connected through a linkage 19 to the signal input lever 20 of the valve 16. "Feel" is provided at the pilot-operated lever 17 by centering springs 21, 22 which oppositely bias an idler lever 23 attached at its free end to the linkage 19. A trim actuator, preferably an electrically energized linear actuator 13, is included in the linkage 19 for providing elevator trim and automatic flight control by signals provided through its cable 24. These signals are provided by a first source of command signals (for example, an elevator trim control located, as will be described, in the hand grip 18) and by a second source of command signals which may be any one or any combination of the automatic flight control or assist devices supplied in the aircraft and which (to provide a specific example) will be designated an automatic pilot. Signals indicative of actual position of the actuator output member 39 are provided by a follow-up device 41 (a variable transformer, potentiometer, etc.) supplying an output through lead 42. A linkage 43 connects the movable element of the follow-up device 41 to the actuator output member 39. Changes in length of the trim actuator 13 introduce changes in length of the linkage 19 and therefore changes in steady state position of the elevator 10 since the length of the trim actuator 13 is effective in determining the total length of the linkage 19 both when the control lever is manually operated and also when it is held in its centered position by the feel springs 21, 22 and flight control is under influence of the automatic pilot. Length changes in the trim actuator 13 brought about by signals from the automatic pilot vary the position of the control surface actuator servo valve lever 20 independently of motion of the pilot's lever 17, which during autopilot operation of the aircraft is held in its neutral position by the feel springs 21, 22. Actuator length changes thus effect positional adjustments of the elevator 10 necessary to maintaining a reference attitude of the aircraft adopted by the automatic pilot, as is familiar to those versed in the art, at the time of its engagement. While the above is broadly representative of an arrangement employed in many contemporary aircraft, it will be understood that the invention is applicable in cases where the control surface 10 is operated directly by the actuator herein designated the trim actuator 13 or in installations in which the manually controlled lever 17 is not employed, control of the body such as the elevator 10 being derived altogether from the output of the first and second sources of command signals to the actuator 13. It also will be understood that while the invention is described in connection with an aircraft, it is by no means limited to such application and is of great utility in other applications, for example in marine navigation equipment, automatic or operator-controlled manufacturing machines, and in still other cases where a device is subject to control by command signals provided simultaneously from a plurality of sources, one or more of which sources may be caused to cease to provide a signal, thus leaving the device under control of the signal produced by the remaining source or sources.

FIGURE 2 shows a device including a form of the first source of command signals, which latter may be any device producing an electrical signal a parameter of which is controllable, for example, at the will of an operator. The device includes a hand grip preferably similar to the grip shown and described in the U.S. Patent Re. 24,701 to W. G. Redmond, the grip housing 18 containing a signal-emitting device such as a potentiometer 25 or equivalent. Adjustment of the output of the potentiometer 25 is effected by manual rotation of a knob or wheel 27, preferably knurled, which is accessible from the exterior of the housing 18, the wheel 27 being connected, as is known in the art, with the movable element, ordinarily the wiper, of the potentiometer. Electrical leads 28 extending from the hand grip carry the output and power supply circuits of the potentiometer 25. The first signal source (i.e., the potentiometer 25) also is adjustable (as will be described) by means of an electrical motor 29 mounted in the housing and connected by means including a gear train 30 to the shaft 31 connecting the wheel 27 to the movable element of the potentiometer 25. The potentiometer 25 thus is adjustable both by manual rotation of the wheel 27 and by rotation of the shaft 31 by the motor 29. The housing 18 also conveniently mounts a switch 32, preferably of a push-button type, which as will be seen is employed in switching on and off the control exerted by a second signal source (to be described) on the actuator 13 of FIGURE 1. The first source of command signals is described, for convenience, as the potentiometer 25 employed in relation to pitch control of the aircraft, but it will be understood that a signal-emitting means related to some other function, such as the roll control potentiometer shown at 26 and described in the above-referenced U.S. Patent Re. 24,701, may be employed as the first signal source in a system or device according to the invention, as may still other signal sources of controllable or settable output in aircraft as well as in other environments.

In FIGURE 3, the first source of electrical command signals 25 is shown as having a resistance element 33 and an element or wiper 34 which is positionally adjustable for varying the command signals yielded thereby. The means connecting the motor 29 to the positionable element is shown at 35, and an amplifier 36 incorporating a summing device 37 receives the output of the first signal source 25 through a lead 38. The actuator 13 is shown as having an output member 39 to which the movable element 40 of the follow-up device 41 is linked as at 43. The follow-up device 41 produces an electrical signal a value of which varies with the position of the output member 39 and which is fed through the lead 42 into the summing device 37.

Other input signals which also are introduced into the summing device 37 may be disengaged, thus engendering an abrupt change in the net sum of the command signals received by the amplifier 36. Such other signals may be produced by a second signal source such as, for example, an autopilot 44.

The first switching means, operative for connecting and disconnecting the second signal source 44 to the amplifier summing means 37 through the leads 46, 47, preferably includes a double pole pushbutton switch assembly 45 or equivalent. The movable contact 48 closeable for passing the output of the autopilot 44 to the summing device 37 is of the locking variety, i.e., one push of the button 49 of the switch closes and locks the contact 48, while the next push releases and opens it. The remaining movable element 50 of the switch 45 is closed by pushing the switch button 49 and does not lock, the closing contact of this element 50 being momentary.

The second switching means, which now will be described, is variable between a first condition in which the output of the amplifier 36 is connected into the actuator 13 and a second condition in which the amplifier output is connected, alternatively, into the servomotor 29. This means preferably comprises a relay 51 whose coil 52 is connected (preferably through a rectifier 62) to a power lead 53 by pressing the switch button 49 for closing the contact 50 associated with the first switching means movable contact 48. The coil 52 also is connected to a fixed contact associated with a normally open movable contact element 54 of the relay 51, the contact 54 being in turn connected through a rectifier 55 to the output of the amplifier 36. A second movable contact 56 of the relay 51 is movable to a first position in which it connects the actuator 13 to the amplifier 36 and a second condition in which the lead 57 to the servomotor 29 is connected to the amplifier. According to a feature of the invention, this lead 57 is interrupted or completed in its connection with the servomotor 29 according to the position of a third movable element 58 of the relay 51 which, in one position, permits connection, by the second element 56, of the servomotor 29 to the amplifier 36 and in its other position connects the servomotor 29 to a source of D.C. power 59.

The means placing the second switching means contact 54 in its second condition when the first switch element 48 is opened include the other element 50 of the first switch and the power lead 53, rectifier 62, and relay coil 52.

The means holding the second switch means 51 in its second condition includes the lead 60 connecting the amplifier 36 through the relay contact 54, following closure of the latter, with the coil 52. The relay 51 includes a spring 61 or similar device which places the relay contacts back in their first condition (as shown in FIGURE 3) upon their release by the holding means. Release is effected when the output of the amplifier 36 is low enough to no longer energize the coil 52 sufficiently for holding the contacts of the relay 51 in their second condition against the opposing force of the spring 61.

The first signal source movable element 34 ordinarily is most frequently subject to manual adjustment during times when the aircraft flies with the autopilot 44 disengaged, although in many aircraft it ordinarily is further adjustable, if this should for any reason be desired, with the first switching means element 48 locked in its closed position to engage the autopilot. During flight under control of the autopilot 44, some values of the numerous factors which affect the pitch attitude of the aircraft tend to change, so that even though the output of the autopilot 44 at the time of its engagement is of a given value (for example, zero), it almost invariably is of some other value at the time of disengagement of the autopilot. Assume, then, that the aircraft has, for an appreciable time, been under control of the autopilot 44 and, for example, is stable in pitch attitude and flying at a constant altitude. The summing device 37 receives the signals of the first and second command signal sources 25, 44 and of the follow-up device 41 and supplies their sum to the amplifier 36. Since the aircraft already is in its correct attitude in pitch, that sum is nominally zero, and the output of the amplifier 36 also is a nominal zero; thus, while the amplifier output is connected through the movable contact 56 into the actuator 13, the latter is not energized to cause movement of the output member 39. While the sum of the signals of the autopilot 44, trim potentiometer 25, and follow-up device 41 is zero, that of only the trim potentiometer 25 and follow-up device 41 is a value other than zero (except in the rare case where the output of the autopilot 44 is zero). Opening the first switching means contact 48 to disconnect the autopilot 44 from the summing device 37 results in momentary energization of the coil 52 through power lead 53, contact 50, and rectifier 62, whereby the second switching means movable contact 56 is immediately moved to a position in which it connects the amplifier 36, through the lead 57, into the positioning means servomotor 29 and disconnects the amplifier 36 from the actuator 13. At the same time, closure of relay contact 54 connects the coil 52 to the output of the amplifier 36 through the rectifier 55. Disconnection of the autopilot 44 ordinarily is accompanied by a considerable departure of the amplifier output from zero; and this output, if directed to the actuator 13, would cause an abrupt and undesirable change in position of the output member 39 which would bring about departure of the aircraft from the desired flight attitude occupied upon disconnection of the autopilot; for the output member 39 would be shifted until the sum of the signals of the first signal source 25 and follow-up device 41 were a nominal zero (i.e., a value too small to result in an amplifier signal effective in producing further shifting of the output member 39). Since the amplifier output is sent instead to the servomotor 29, the actuator 13 is not energized, and it is the servomotor 29 which is driven to shift the setting of the first signal source positionable element 34 until the sum of the signals of the first signal source 25 and follow-up device 41 is a nominal zero. While this is taking place, the coil 52 is energized and the above-delineated positioning of the first switching means contacts 54, 56 is maintained through power supplied by the amplifier 36 through the contact 54. Upon the signals of the first signal source 25 and follow-up device 41 reaching a null, the output of the amplifier 36 decreases to a value so that coil 52 is no longer energized sufficiently to maintain this positioning, and the biasing means 61 returns all three contacts 54, 56, 58 to their respective positions shown in the drawing. The amplifier 36, when thus again connected to the actuator 13, has a nominally zero output and causes no change in the position of the output member 39; thus, no sudden and undesirable change in flight attitude occurs, for the output of the first signal source 25 has first been adjusted into correspondence with the actual position of the output member 39. This adjustment having been made, the first signal source position- able element is manually adjustable as may be desired for subsequent pitch trim changes.

In the rare case where the autopilot 44 is disconnected while its output is effectively zero, the operation of the device is the same as described above except that the coil 52 will not receive, from the amplifier 36, electrical energy above the given value required to enable it to hold the contact 54 closed; therefore, the three contacts 54, 56, 58 will return to their positions shown immediately upon the pushbutton 49 being released.

The respective rectifiers 55, 62 of course are not necessary where the power lead 53 and/or amplifier 36 have a D.C. output. The contact 58 and D.C. power source 59 are not essential, yet are employable to great advantage in braking the trim adjustment wheel 27 (FIGURE 2). Without this arrangement, the servomotor 29 (FIGURE 3) acts as a flywheel when not energized by connection to the amplifier 36, and rotation imparted manually to the wheel 27 for trim adjustment when the servomotor 29 is not connected to the amplifier 36 continues after the rotation-initiating force is removed. Thus, the positionable element 34 (FIGURE 3) is apt to coast past a position to which it has been moved by hand by action of the inertia of the servomotor 29, the latter being disconnected (as described) from the amplifier 36 when a null is reached between the signals of the first signal source 25 and follow-up device 41. With the arrangement described, however, the synchronous motor 29 is connected into the D.C. power source 59 as soon as disconnected from the amplifier 36. The D.C. power impressed on the motor 29 has a braking effect which immediately stops rotation of the servomotor 29. The adjusting wheel 27 (FIGURE 2) connected to the motor 29 is still easily adjusted by hand, but the wheel feels as if it had a very well constructed viscous brake applied to it which eliminates the flywheel action of the servomotor 29 without the undesirable drag which an actual viscous brake would produce on the motor 29 during its operation while energized by the amplifier 36.

Although the above-described form of the invention is preferred for aircraft usage, the device is readily simplified by removal of contact 50, coil 52, spring 61, contact 54, leads 53, 60, and rectifiers 55, 62. Contacts 56, 58 thereupon are operated manually as a double pole, double throw switch. Operation, although manual, will remain as before: upon opening contact 48 to disconnect the autopilot 44 from the amplifier summing device 37, the contact 56 is moved by hand to connect the servomotor 29 to the output of amplifier 37 and disconnect servomotor 29 and actuator 13 from, respectively, the output of the D.C. power source 59 and amplifier 36. When the servomotor 29 has stopped running (an event signalled by cessation of rotation of the wheel shown at 27 in FIGURE 2), the contacts 56, 58 are manually moved back to their position shown in FIGURE 3. If the D.C. power source is not employed for braking, the contact 58 and power source 59 of course are omitted.

Another modification of the invention is shown in FIGURE 4. The actuator follow-up device 41, first and second electrical command signal sources 25, 44, amplifier 36, and servomotor 29 are as before. A first switch 45A has a closed position in which it connects the second command signal source 44 into the amplifier summing device 37 and is movable to an open position wherein the second command signal source 44 is disconnected from the amplifier 36. A second switch 56A is connected between the amplifier 36 and the actuator 13 on the one hand and the servomotor 29 on the other. By a spring 61A or equivalent, switch 56A is biased to a first position or condition in which its contacts are closed (as shown) to connect the amplifier output into the actuator 13; switch 56A is movable to a second position in which the amplifier output is disconnected from the actuator 13 and connected into the servomotor 29. A linkage 63 between the first and second switches 45A, 56A is so arranged as to move the second switch 56A to and hold it in its second position when the first switch 45A is opened, and this linkage 63 is disengageable from the second switch 56A in order that, after the servomotor 29 has ceased to receive energy from the amplifier 36, the second switch 56A will be returned, as by the spring 61A or other biasing means, to its first position while the first switch 45A will remain in its second position wherein it disconnects the second signal source 44 from the amplifier 36.

While the linkage 63 may be constructed in any convenient manner enabling it to produce the operation just described, a simple linkage for this purpose is shown, to provide an example, in FIGURE 5. The item 64 is a two-position toggle switch containing the autopilot switch element 45A of FIGURE 4. With reference to both FIGURES 4 and 5, contact 56A is contained in two-position switch 65 whose toggle is internally spring-loaded to place contact 56A in the position shown in FIGURE 4, the toggle of switch 65 then being positioned as shown in solid line. Ball joint 66 connects the toggle of switch 64 to a linkage rod or strip 63 bearing a cam or detent 68, the rod 63 being biased by resilient means such as spring 69 to a position in which detent 68 engages a face of the toggle of switch 65. When the autopilot 44 is turned off by moving the toggle of switch 64 to its position shown in dotted line, thus opening contact 45A, detent 68 pushes the toggle of switch 65 to its dotted-line position to place contact 56A in position for disconnecting actuator 13 and connecting servomotor 29 to amplifier 36. When motor 29 stops running, the outputs of signal source 25 and follow-up device 41 having reached a null, rod 63 is is rotated by hand against the biasing force exerted by spring 69 to move the detent 68 out of register with and hence release the toggle of switch 65, which is moved back by an internal bias (for example, by the spring 61A of FIGURE 4) to its solid-line position to re-connect the actuator 13 to the amplifier 36 and disconnect the servomotor 29. The trim potentiometer movable element 34 is positioned manually as may be desired during autopilot-off operation of the aircraft. Upon the toggle of switch 64 being moved back to its solid-line position to again connect the second signal source 44 to the amplifier 36, the slanted forward surface of the detent 68 rides up over the toggle of switch 65, and the detent 68 then drops behind the toggle of switch 65 and re-engages it in preparation for the next disengagement of the autopilot 44.

In all modifications of the device herein described, it will be noted that, upon disconnection of the second signal source 44 from the amplifier 36, the output level of the trim potentiometer 25 is adjusted by the servomotor 29 into conformity with the contemporary, actual position of the actuator output member 39 before supplying the output of the amplifier 36 to the actuator 13. As a consequence, the transition from joint control by the first and second signal sources 25, 44 to control by the first signal source 25 alone is smooth and without any disturbance to the trim of the aircraft.

While only one embodiment of the invention, together with modifications thereof, has been described in detail herein and shown in the accompanying drawing, it will be evident that various further modifications are possible in the arrangement and construction of its components without departing from the scope of the invention.

We claim:

1. In combination with a system comprising an actuator with an output member, a follow-up device mechanically connected with and producing an electrical follow-up signal corresponding to the position of the output member, a first source of electrical command signals having an element positionally adjustable for varying the first source electrical command signals, a second source of electrical command signals, and an amplifier for receiving and adding the command and follow-up signals and producing an output which corresponds to their sum, a device comprising: a motor drivingly connected to the positionally adjustable element; switching means for connecting and disconnecting the second source of signals from the amplifier; and switching means for selectively connecting the amplifier output into the motor and actuator.

2. In combination, an actuator having an output element; a follow-up device mechanically associated with and producing an electrical follow-up signal corresponding to the position of the output element; a hand grip for control of the actuator by an operator; a first electrical command signal source mounted in the hand grip and having an element positionally adjustable for varying the output of the first command signal source; a servomotor mounted in the hand grip and drivingly connected with the positionally adjustable element; a second electrical command signal source; summing means for receiving and adding the command and follow-up signals and producing an output which corresponds to their sum; means for connecting and disconnecting the second command signal source from the summing means; and means for selective connection of the summing means output into, respectively, the servomotor and actuator.

3. In combination with a system comprising an actuator with an output member, a follow-up device mechanically connected with the output member and producing an electrical follow-up signal corresponding to the position of the output member, a first source of electrical command signals having an element positionally adjustable for varying the second source electrical command signals, a second source of electrical command signals, and an amplifier for receiving and adding the command and follow-up signals and producing an electrical output corresponding to their sum, the second source of signals being selectively connectible to and disconnectible from the amplifier, the device comprising: means for positioning the positionally adjustable element; and switching means movable when the second source of signals is disconnected from the amplifier to a position in which the amplifier output is connected to the positioning means and disconnected from the actuator, said positioning means being responsive to the amplifier output for driving the positionally adjustable element to a position in which the amplifier output is below a given value, the switching means being movable thereafter to a position in which the amplifier output is disconnected from the positioning means and connected into the actuator.

4. In a servo-controlled system of the kind having an actuator with an output member, a follow-up device mechanically connected with and producing an electrical follow-up signal corresponding to the position of the output member, a first source of electrical command signals having an element positionally adjustable for varying the first source electrical command signals, a second source of electrical command signals, an amplifier for receiving and summing the command and follow-up signals and producing an output which corresponds to their sum, and first switching means for connecting and disconnecting the second source of signals from the amplifier, the combination with the positionally adjustable element and amplifier of: a servomotor drivingly connected to the positionally adjustable element; and second switching means selectively connecting the amplifier output into the servomotor and actuator.

5. In a servo-controlled system of the kind having an actuator with an output member, a follow-up device mechanically connected with and producing an electrical follow-up signal corresponding to the position of the output member, a first source of electrical command signals having an element positionally adjustable for varying the first source command signals, a second source of electrical command signals, an amplifier connected to the first source of command signals and follow-up device, and a switch having a closed position in which it connects the second source of command signals into the amplifier and an open position in which the second source of command signals is disconnected from the amplifier, the amplifier being operative for summing the command and follow-up signals received thereby and producing an output corresponding to the sum of the received signals, the combination with the positionally adjustable element and the switch of: a servomotor drivingly connected to the positionally adjustable element; switching means variable between a first condition in which the amplifier output is connected into the actuator and a second condition wherein the amplifier output is connected into the servomotor; means placing the switching means in its second condition when the switch is opened, said means being operably associated with the switch; means for holding the switching means in its second condition while the amplifier output in response to signals received from the first source of command signals and follow-up device exceed a given value and for effecting release of the switching means when the amplifier output drops below said given value; and means placing the switching means in its first condition upon its release.

6. In a servo-controlled system of the kind having an actuator with an output member, a follow-up device mechanically connected with and producing an electrical follow-up signal corresponding to the position of the output member, a first source of electrical command signals having an element positionally adjustable for varying the first source command signals, a second source of electrical tion in which it connects the second source of command signals into the amplifier and an open position in which the second source of command signals is disconnected from the amplifier, the amplifier being operative for summing the command and follow-up signals received thereby and producing an output corresponding to the sum of the received signals, the combination with the positionally adjustable element and the first switch of: a servomotor drivingly connected to the positionally adjustable element; a second switch biased to a first position in which the amplifier output is connected into the actuator and movable against its bias to a second position in which the amplifier output is connected into the servomotor; and a linkage connecting the first and second switches and moving the second switch to and holding it in its second position when the first switch is opened, said linkage being disengageably connected to the second switch to permit disengagement of the linkage and return of the second switch to its first position after the first switch having been moved to its second position by the linkage.

7. In combination, a first source of electrical command signals having an element movable for adjusting said command signals; a servomotor connected to the movable element for positional adjustment of the same; a second source of command signals; an actuator with an output member; a follow-up device connected to and producing signals corresponding to the position of the output member; an amplifier receiving the first command and follow-up signals; first means for connecting the second signal source to and disconnecting the same from the amplifier, the amplifier adding the command and follow-up signals received thereby and producing an output which corresponds to their sum; and second means connecting the actuator to the amplifier output when the second signal source is connected to the amplifier and connecting the servomotor to the amplifier output when the second signal source is disconnected from the amplifier and while, following said disconnection of the second signal source, the amplifier output exceeds a given value.

8. The combination recited in claim 7, the servomotor and actuator being A.C. devices and the combination further including a source of D.C. power and means associated with the second means recited in claim 7 and connecting the D.C. power source into the servomotor when the latter is disconnected from the amplifier output.

References Cited in the file of this patent

UNITED STATES PATENTS

| Re. 24,701 | Redmond | Sept. 15, 1959 |
| 2,586,095 | Roters | Feb. 19, 1952 |
| 2,734,155 | Schuck | Feb. 7, 1956 |

UNITED STATES PATENT OFFICE
CERTIFICATE OF CORRECTION

October 23, 1962

Patent No. 3,060,362

William G. Redmond et al.

It is hereby certified that error appears in the above numbered patent requiring correction and that the said Letters Patent should read as corrected below.

Column 9, line 30, before "tion" insert -- command signals, and a first switch having a closed posi- --.

Signed and sealed this 26th day of March 1963.

(SEAL)
Attest:

ESTON G. JOHNSON
Attesting Officer

DAVID L. LADD
Commissioner of Patents